US009274824B2

(12) United States Patent
Blake et al.

(10) Patent No.: US 9,274,824 B2
(45) Date of Patent: Mar. 1, 2016

(54) NETWORK TECHNOLOGY STANDARD OPERATING ENVIRONMENT

(71) Applicant: Verizon Patent and Licensing Inc., Basking Ridge, NJ (US)

(72) Inventors: Michael R. Blake, Southlake, TX (US); John Stephen Bartholomew, Farmers Branch, TX (US); Anthony W. King, Flower Mound, TX (US); Michael A. Jaquays, Saginaw, TX (US); Mike A. Craig, Little Elm, TX (US); Dinyar Kavouspour, Plano, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 296 days.

(21) Appl. No.: 13/929,132

(22) Filed: Jun. 27, 2013

(65) Prior Publication Data
US 2015/0007171 A1 Jan. 1, 2015

(51) Int. Cl.
*G06F 9/455* (2006.01)
(52) U.S. Cl.
CPC .................... *G06F 9/45537* (2013.01)
(58) Field of Classification Search
None
See application file for complete search history.

(56) References Cited

U.S. PATENT DOCUMENTS

| | | | |
|---|---|---|---|
| 7,577,722 B1* | 8/2009 | Khandekar et al. | 709/220 |
| 8,065,676 B1* | 11/2011 | Sahai et al. | 718/1 |
| 8,667,138 B2* | 3/2014 | Ganesan et al. | 709/226 |
| 8,683,464 B2* | 3/2014 | Rozee et al. | 718/1 |
| 2008/0155223 A1* | 6/2008 | Hiltgen et al. | 711/173 |
| 2008/0244579 A1* | 10/2008 | Muller | 718/100 |
| 2009/0106256 A1* | 4/2009 | Safari et al. | 707/10 |
| 2010/0017801 A1* | 1/2010 | Kundapur | 718/1 |
| 2010/0058342 A1* | 3/2010 | Machida | 718/1 |
| 2010/0313200 A1* | 12/2010 | Rozee et al. | 718/1 |
| 2011/0088029 A1* | 4/2011 | Murase | 718/1 |
| 2012/0110185 A1* | 5/2012 | Ganesan et al. | 709/226 |
| 2012/0144391 A1* | 6/2012 | Ueda | 718/1 |
| 2012/0233611 A1* | 9/2012 | Voccio | 718/1 |
| 2012/0254567 A1* | 10/2012 | Umbehocker | 711/162 |
| 2012/0265976 A1* | 10/2012 | Spiers et al. | 713/2 |
| 2012/0284710 A1* | 11/2012 | Vinberg | 718/1 |
| 2012/0311377 A1* | 12/2012 | Blood et al. | 714/4.12 |
| 2013/0007710 A1* | 1/2013 | Vedula et al. | 717/124 |
| 2013/0055249 A1* | 2/2013 | Vaghani et al. | 718/1 |
| 2013/0151705 A1* | 6/2013 | Menon et al. | 709/226 |
| 2013/0185436 A1* | 7/2013 | Carlin et al. | 709/226 |
| 2013/0232498 A1* | 9/2013 | Mangtani et al. | 718/104 |
| 2013/0275968 A1* | 10/2013 | Petev et al. | 718/1 |
| 2013/0275969 A1* | 10/2013 | Dimitrov | 718/1 |
| 2014/0019974 A1* | 1/2014 | Siu et al. | 718/1 |
| 2014/0130055 A1* | 5/2014 | Guha | 718/104 |
| 2014/0250436 A1* | 9/2014 | Tang et al. | 718/1 |
| 2015/0106813 A1* | 4/2015 | Mihalocivi et al. | 718/1 |

* cited by examiner

*Primary Examiner* — Emerson Puente
*Assistant Examiner* — Mehran Kamran

(57) ABSTRACT

Method, device, and storage medium to provision virtual machines, software, storage, and network resources of a standard operating environment including devices having identical software, hardware, and configurations. A provisioning device uses dedicated flows based on the resource to be provisioned.

20 Claims, 11 Drawing Sheets

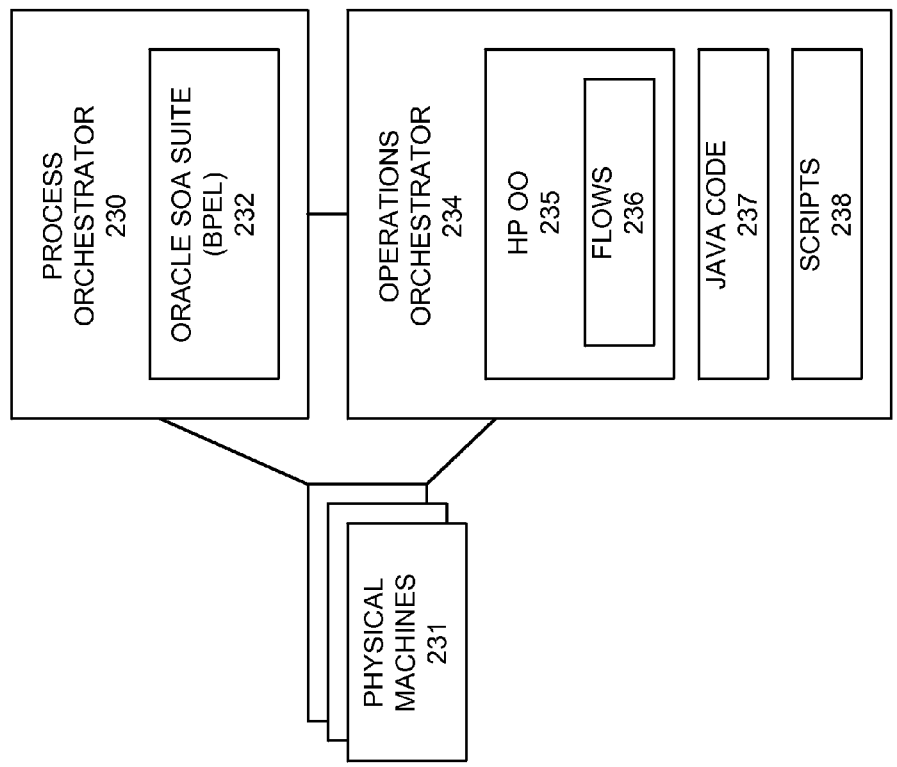

NETWORK TECHNOLOGY STANDARD OPERATING ENVIRONMENT

BACKGROUND

Large-scale service providers are hampered with enormous infrastructures to manage and maintain. For example, an enterprise may have to manage thousands of devices and a multitude of applications in a data center. Typically, there exists a diversity of network devices that operate according to various operating systems, middleware systems, etc., to accommodate the diversity of applications.

BRIEF DESCRIPTION OF THE DRAWINGS

FIG. 2C is a diagram illustrating an exemplary implementation of the provisioning engine;

DETAILED DESCRIPTION OF PREFERRED EMBODIMENTS

The following detailed description refers to the accompanying drawings. The same reference numbers in different drawings may identify the same or similar elements.

Data centers in an enterprise framework support a multitude of applications. However, typically in such an infrastructure, there exists a diversity of network devices (e.g., servers) that operate according to various operating systems, middleware systems, etc. Such an approach adds an unnecessary complexity to budgeting, purchasing and procurement of resources, deployment of resources, maintenance, migration, elasticity, redundancy, efficiency, etc. A standard operating environment may address the drawbacks of such existing infrastructures.

Figure 1:
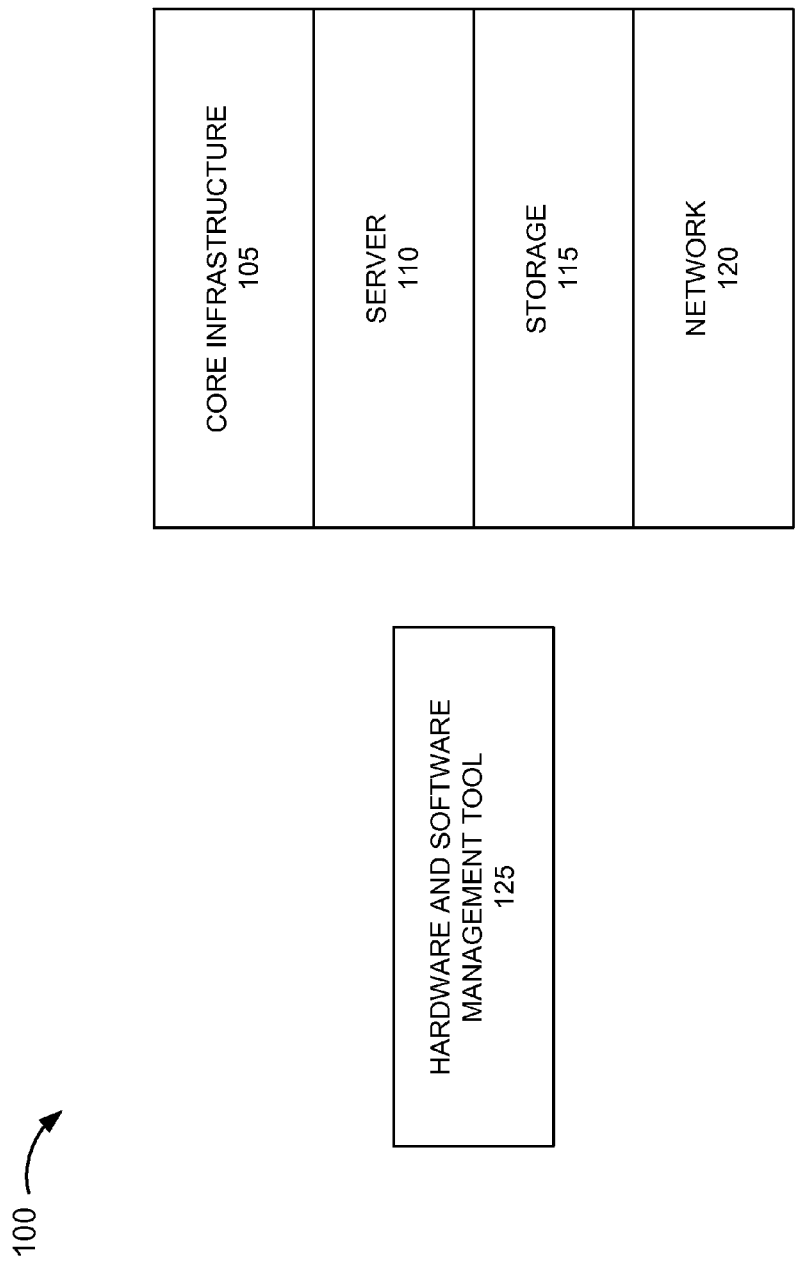
FIG. 1 is a diagram illustrating elements of an exemplary embodiment of a standard operating environment.

According to an exemplary embodiment, a network provides applications and services based on a standard operating environment (SOE). For example, the network may be implemented as a data center. According to an exemplary embodiment, as illustrated in FIG. 1, a standard operating environment 100 includes a core infrastructure element 105, a server element 110, a storage element 115, a network element 120, and a hardware and software management tool 125. The elements of standard operating environment 100 are designed to support an application infrastructure and the tools needed to integrate these elements. Standard operating environment 100 provides a common infrastructure on which applications and services may be deployed and managed.

Core infrastructure element 105 includes an operating system. For example, the operating system of a server of server element 110 may be implemented using the Linux® operating system or the Windows® operating system. Core infrastructure element 105 also includes a hypervisor. For example, the hypervisor may be implemented using Oracle® VM Server virtualization software, VMware® virtualization software, a combination thereof, etc. The hypervisor provides a virtual operating platform for an application, allows for automation, and provides a layer of abstraction that separates an application from the infrastructure. This separation allows for the infrastructure to be manipulated (e.g., serviced, changed, upgraded, etc.) with minimal impact to the application.

Server element 110 includes commodity servers. The physical machines to implement the commodity servers are identical to ensure consistency and uniformity. For example, each physical machine may be implemented using an HP® BladeSystem c7000 enclosure. Each physical machine includes identical hardware to ensure consistency and uniformity among the servers. For example, each physical machine may be implemented using a multi-core 64-bit x86 processor having a mid-power, two-socket configuration. Additionally, for example, each physical machine may be implemented using the same dual in-line memory module (DIMM) (e.g., 192 GB DDR3-1333 Hz), the same hard drive (e.g., 2×146 GB 15 k HDD), and the same blades (e.g., 16 BL460-G7 Half-high Dual Socket Blades)

Each physical machine is connected to links of network element 120. For example, each physical machine may be connected to multiple 10 Gbps Ethernet links or greater. For example, 2×4-Port 10 GbE VPC trunks per chassis and 2×1 GbE out-of-band (OOB) connections per chassis may be implemented to provide interconnectivity. The out-of-band connections may be used for remote access, while the VPC trunks may be used for customer access. The distance between physical machines (e.g., within a data center) may be such to allow copper 10 Gbps Ethernet links versus optical links. However, increased server densities can yield power and cooling challenges. According to an exemplary implementation, a hot aisle containment arrangement may be used.

According to an exemplary embodiment, each physical machine of server element 110 may boot off of storage element 115. According to such an implementation, the hard drive of a physical machine (e.g., associated with a server) may only store the hypervisor. As a result, power consumption, heat generation, and cost pertaining to server element 110 may be reduced. Additionally, through the use of server virtualization, storage virtualization, and a scalable network, technology refreshes of the infrastructure (e.g., server, storage, and network elements) may be performed with no application outage and application regression testing.

Storage element 115 includes network attached storage (NAS). The physical machines to implement the NAS are identical to ensure consistency and uniformity. For example, NetApp® FAS6280 enterprise storage system may be used to provide storage. Each storage system is connected to links of network element 120. For example, storage arrays may be connected to multiple 10 Gbps Ethernet links or greater using virtual port channels (VPCs) or Multi-Chassis Link Aggregation Groups (MLAGs). By way of further example, 1×4-port 10 GbE VPC trunk per filer and 1 GbE OOB connection per filer may be implemented to provide interconnectivity.

Storage element 115 includes other capabilities. For example, software included with NetApp® FAS6280 enterprise storage system provides various services, such as de-duplication, thin provisioning, snapshot, replication, compression, and data cloning. For example, de-duplication identifies duplicate blocks of data and replaces the duplicate blocks with pointers to a single copy of the block of data. As a result, storage consumption may be reduced for storage element 115, particularly for data sets that have a high amount of duplicative data. Thin-provisioning presents a static capacity to a client while reserving space on a storage array necessary to store the data written by the client. As a result, over-allocation of a storage array of storage element 115 and higher utilization of the storage array may be achieved. Snapshot provides a form of backup within the standard operating environment 100. Snapshot allows for a point-in-time backup of the data on a storage array of storage element 115. According to an exemplary implementation, for data that needs to be protected, a copy of the data may be transmitted to a separate storage array of storage element 115. Additionally, if off-site copies are needed, according to an exemplary implementation, the data is copied to another storage array at an off-site location. Alternatively, for example, the data may be copied to tape for off-site storage. A backup of data residing on a storage array of storage element 115 remains stored on the storage array until aged off or needed for recovery.

Storage element 115 allows for the automation of storage provisioning and management (e.g., increase storage, decrease storage, recovery, duplication, etc.). An automated process may provide consistent results and may be logged and audited. Storage element 115 may also allow for post-provisioning, automated, processes such as off-frame and/or off-site data copying/storage. Storage element 115 also allows for the gathering of performance information (e.g., metrics) pertaining to storage arrays and the analysis thereof. For example, the number of input output operations per second (TOPS) may be gathered from a storage array. This information may be analyzed to determine whether the storage array is properly allocated. As described further below, standard operating environment 100 includes tools to allow users to automate and manage other elements (e.g., storage element 115, etc.) of the standard operation environment 100.

Network element 120 includes links to server element 110 and storage element 115. Network element 120 may include other types of physical machines, such as switches, load balancers, firewalls, DNS servers, IP address management, etc., and links thereto. According to an exemplary embodiment, each physical machine is connected via multiple 10 Gbps links or greater, which are bonded together for redundancy. Depending on the type of switches used, VPCs or MLAGs may be used to interconnect active/active redundant connections from the servers to the switches. Various network elements may also be implemented to allow for automation. For example, load balancers and firewalls may be implemented to allow for automatic creation and modification.

Hardware and software management tool 125 allows a user to manage the standard operating environment 100. For example, hardware and software management tool 125 may be implemented with a workflow tool, an automation tool, a monitoring and performance tool, an inventory tool, an administration tool, and an alerts and reports tool. The workflow tool allows a user to create a request that can alter the hardware, the software, or a combination thereof, of standard operating environment 100. The automation tool allows the user to automate the execution of the request. The monitoring and performance tool allows the user to monitor usage and performance of resources of the standard operating environment 100. The inventory tool allows the user to view resources (e.g., physical machines, virtual machines, etc.) of the standard operating environment 100. The administration tool allows the user to perform various administrative and management functions, such as views of departments, end user permissions, etc. The alerts and reports tools allow the user to receive alerts and generate reports pertaining to the standard operating environment 100.

Standard operating environment 100 should be deployed in a consistent and uniform manner. For example, the configuration of a blade chassis, a network switch, a storage array, an operating system, and a database, is deployed in a consistent and uniform manner. Additionally, the consistency and uniformity of standard operating environment 100 allows for expedited problem resolutions, application of a resolution throughout the infrastructure, and facilitates support.

The physical infrastructure of standard operating environment 100 is deployed in set units or blocks. According to such an approach, there is a predictability for an organization (e.g., a service provider, a network provider, etc.) pertaining to purchasing, operations (e.g., how much power, cooling, space, etc., is needed), physical installation (e.g., plugs needed, how to cable it, etc.), resource availability (e.g., how much capacity is provided, etc.), etc.

While exemplary embodiments provided in this description may be implemented based on the use of a particular network architecture, platform, etc., such implementations are not intended to be restrictive or provide an exhaustive treatment, as such. In other words, the embodiments described herein may be implemented using other suitable network architectures, platforms, etc., which may not be specifically described.

Figure 2A:
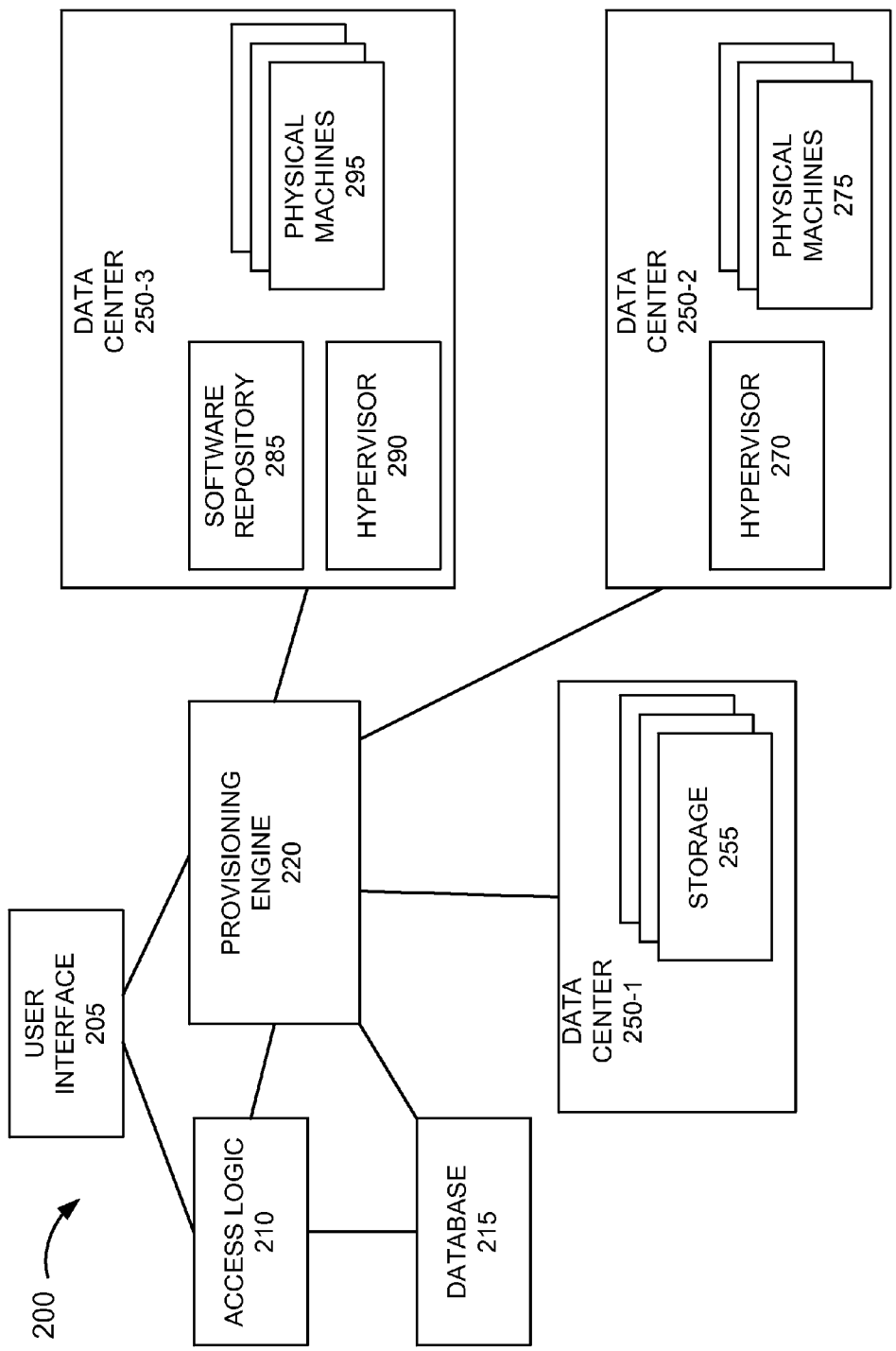
FIG. 2A is a diagram illustrating an exemplary infrastructure in which an exemplary embodiment of the standard operating environment may be implemented.

FIG. 2A is a diagram illustrating an exemplary infrastructure in which an exemplary embodiment of the standard operating environment may be implemented. As illustrated in FIG. 2A, infrastructure 200 includes a user interface 205, an access logic 210, a database 215, a provisioning engine 220 and data centers 250-1 through 250-3 (referred to collectively as data centers 250 or individually as data center 250). Data center 250-1 includes a storage 255. Data center 250-2 includes a hypervisor 270 and physical machines 275. Data center 250-3 includes a software repository 285, a hypervisor 290, and physical machines 295.

Infrastructure 200 may be implemented to include wired and/or wireless connections among the devices and the network illustrated. A connection may be direct or indirect and involve intermediary device(s) and/or network(s) not illustrated in FIG. 2A.

According to other embodiments, a single device in FIG. 2A may be implemented as multiple devices. Additionally, or alternatively, according to other embodiments, multiple devices may be implemented as a single device. A device may be implemented according to a centralized computing architecture, a distributed computing architecture, or a cloud computing architecture. Additionally, a device may be implemented according to one or multiple network architectures (e.g., a client device, a server device, a peer device, a proxy device, or a combination thereof). Also, according to other embodiments, one or more functions and/or processes described as being performed by a particular device may be performed by a different device, or some combination of devices, which may or may not include the particular device.

User interface 205 provides interfaces for use of the standard operating environment. For example, user interface 205 allows a user to make a provisioning request and automate the provisioning thereof. By way of further example, the provisioning request allows the user to provision a resource (e.g., a virtual machine, software, and storage). User interface 205 allows the user to view the status of the provisioning request and manage the resource after provisioning is completed. Additionally, for example, user interface 205 allows the user to view real-time usage data and to track inventory (e.g., by owner, application, server name, etc.). User interface 205 may display user interfaces based on various standards, such as, for example, HyperText Markup Language (HTML), Cascading Style Sheets (CSS), JavaScript, Application Development Framework (ADF) Faces Rich Client components, Flex components, and Flash components. User interface 205 may include a client (e.g., a web client, etc.).

Access logic 210 provides access to the standard operating environment. For example, access logic 210 provides connectors to other entities of the standard operating environment. Access logic 210 may provide single sign-on services and Lightweight Directory Access Protocol (LDAP) services. Access logic 210 may include an Oracle® WebLogic server and ADF components. For example, the ADF components may include ADF business components (ADF BC), ADF controller (ADFc) components, and ADF binding layer (ADFm) components. Access logic 210 may include a server (e.g., a web server, etc.).

Database 215 provides database services for use of the standard operating environment. For example, database 215 stores provisioning request information, inventory information, real-time usage information, authorization/authentication information, product catalog information, and organization information. According to an exemplary implementation, an Extract, Transform, and Load (ETL) application maintains database 215. The ETL application may periodically refresh information stored in database 215, such as real-time information, inventory information, etc.

Provisioning request information includes information pertaining to provisioning requests. Provisioning request includes parameter information to provision a resource. Depending on the type of provisioning request, the parameter information specified for the provisioning request may be different than another provisioning request. For example, a provisioning request to create a primary storage volume, create a secondary storage volume, and perform data replication includes different parameter information than a provisioning request to resize an existing volume. Provisioning request information also includes status information pertaining to the provisioning request. By way of example, the status information includes information indicating whether a provisioning request submitted successfully (e.g., by a user), is currently being processed, is successfully processed and resource provisioned, or failed.

Inventory information includes information pertaining to resources associated with data centers 250. For example, inventory information includes information pertaining to the physical resources (e.g., server devices, storage devices, storage disks, storage controllers, hypervisors, etc.) and virtual resources (e.g., virtual servers, software instances, storage volumes, storage directories, etc.).

Real-time usage information includes usage information pertaining to resources. For example, real-time usage information includes usage information pertaining to virtual machines, such as central processing unit (CPU) and memory usage factors. Additionally, real-time usage information includes usage information pertaining to storage, such as used and free. Real-time usage information may be compiled based on a user-specified time period (e.g., every fifteen minutes, hourly, daily, weekly, monthly, etc.). Real-time usage information may be filtered based on user parameters (e.g., line of business, executive director, application level, etc.).

Authorization/authentication information includes information that permits access to the standard operating environment. For example, authorization information includes user name and password information pertaining to users.

Product catalog information includes information pertaining to the entities used in the standard operating environment. For example, product catalog information includes information pertaining to infrastructures, software, platforms, and templates. For example, infrastructure information indicates virtual machines available to a user for provisioning, such as a Windows server, etc. Software information indicates software available to a user for provisioning, such as System Applications and Products in Data Processing (SAP) ERP Central Component (EEC), Oracle database for SAP, etc. Platforms and templates includes predefined templates, such as SAP with Oracle database on Linux, VSII platform on three servers, or other logical combinations of virtual machines, software, and storages.

Organization information includes information pertaining to a company or a department of a company associated with a resource, users within a company or a department, provisioning requests made by a user of the company of the department, status of the provisioning requests, and applications used by the users of the company or the department.

Provisioning engine 220 controls the provisioning of resources. For example, provisioning engine 220 reads a provisioning request (e.g., from database 215) and selects and invokes the appropriate workflow to perform the provisioning. Provisioning engine 220 monitors the status of a provisioning job. Provisioning engine 220 is described further below.

Referring to data center 250-1, storage 255 includes storage element 115, as previously described. Referring to data center 250-2, hypervisors 270 includes a virtual machine manager. For example, hypervisors 270 may be implemented using Oracle® Virtual Machine (OVM) and VMware® hypervisor. Physical machines 275 include server element 110, as previously described.

Referring to data center 250-3, software repository 285 may include a variety of applications. For example, software repository 285 may include in-house applications. For example, the in-house applications may include financial applications (e.g., pertaining to invoicing, payroll, revenue received, etc.) and business applications. Additionally, or alternatively, software repository may include applications available to customers. For example, a service provider may host applications available to customers pertaining to various services (e.g., Internet service, television service, mobile service, etc.).

Hypervisor 290 includes a virtual machine manager. For example, hypervisors 290 may be implemented using Oracle® Virtual Machine. Physical machines 295 include server element 110, as previously described.

Figure 2B:
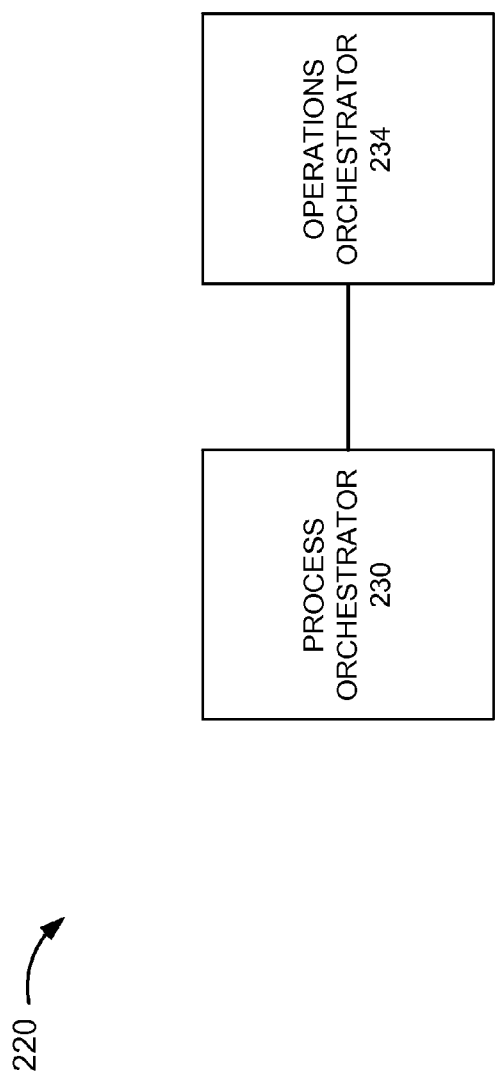
FIG. 2B is a diagram illustrating an exemplary embodiment of the provisioning engine depicted in FIG. 2A.

FIG. 2B is a diagram illustrating an exemplary embodiment of provisioning engine 220. As illustrated, provisioning engine 220 includes a process orchestrator 230 and an operations orchestrator 234.

Process orchestrator 230 controls a process, such as creating, deploying, and managing a resource in standard operating environment 100. For example, process orchestrator 230 reads and interprets a provisioning request, selects and invokes a provisioning flow to perform a provisioning, and tracks the status of the provisioning.

Operations orchestrator 234 performs a process controlled by process orchestrator 230. For example, operations orchestrator 234 may create a virtual machine, install software, and/or perform other processes, as described herein, to fulfill a request. Operations orchestrator 234 may interact with various components of standard operating environment 100, such as virtual machines, storage devices, network, etc.

FIG. 2C is a diagram illustrating an exemplary implementation of provisioning engine 220. As illustrated, provisioning engine 220 includes physical machines 231. Physical machines 231 are implemented using server elements 110, as previously described.

Process orchestrator 230 is implemented using Oracle® SOA Suite Business Process Execution Language (BPEL) software 232. Process orchestrator 230 is described further in relation to FIG. 2D.

Operations orchestrator 234 is implemented using HP® Operations Orchestration (OO) software 235. According to such an implementation, in cases when HP® Operations Orchestration software 235 is unable to integrate with a system of standard operating environment 100 or if the available integration is not suitable for the given requirements, Java code 237 or other suitable programming language code may be used to build an integration to the system. For example, Java code 237 may be made available to HP® Operations Orchestration software 235 using the Action interface provided by HP® Operations Orchestration software 235.

As further illustrated, operations orchestrator 234 includes flows 236. Flows 236 include instructions to complete a task stemming from a request. For example, a flow 236 may indicate that a series of scripts are to be executed to perform a flow 236. Scripts 238 include various types of scripts to perform flows 236. For example, as described further below, scripts 238 include Enterprise Manager Command Line Interface (EMCLI) scripts, Shell scripts, and deployment procedure scripts.

Figure 2D:
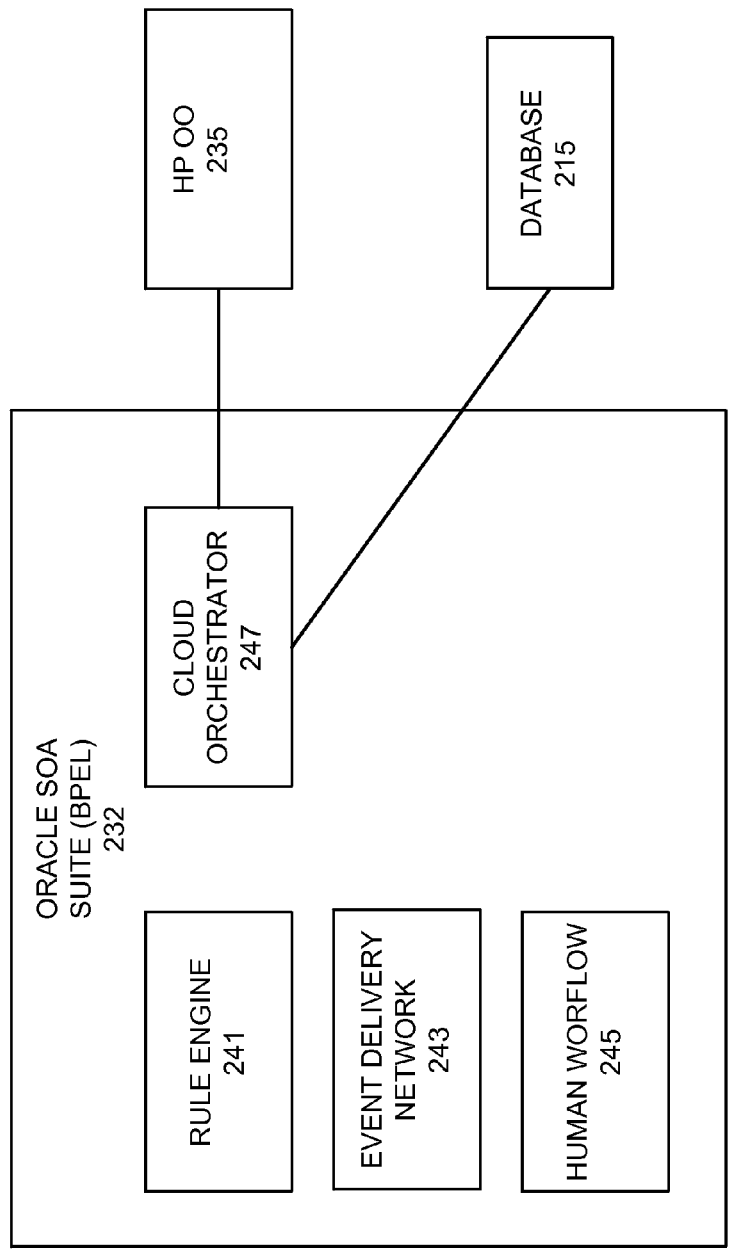
FIG. 2D is a diagram illustrating an exemplary implementation of the process orchestrator depicted in FIG. 2B.

FIG. 2D is a diagram illustrating an exemplary implementation of process orchestrator 230. As illustrated, process orchestrator 230 includes a rule engine 241, an event delivery network 243, a human workflow 245, and a cloud orchestrator 247.

Rule engine 241 includes business rules pertaining to decision making and policies. Event delivery network 243 allows different processes/applications to communicate with each other using events. Human workflow 245 allows users to implement a workflow for a provisioning process. For example, human workflow 245 allows a user to start a work flow after a provisioning request is created to secure the required approvals and information (e.g., IP address, storage details, etc.) to perform a workflow.

Cloud orchestrator 247 is the master controller that controls processes pertaining to the provisioning of resources in standard operating environment 100. Cloud orchestrator 247 integrates with HP OO 235. For example, cloud orchestrator 247 uses JAVA APIs to delegate provisioning to HP OO 235. Cloud orchestrator 247 uses rule engine 241 to make provisioning decisions. For example, cloud orchestrator 247 may use rule engine 241 to decide on which server pool a virtual machine needs to be provisioned.

Figure 3A:
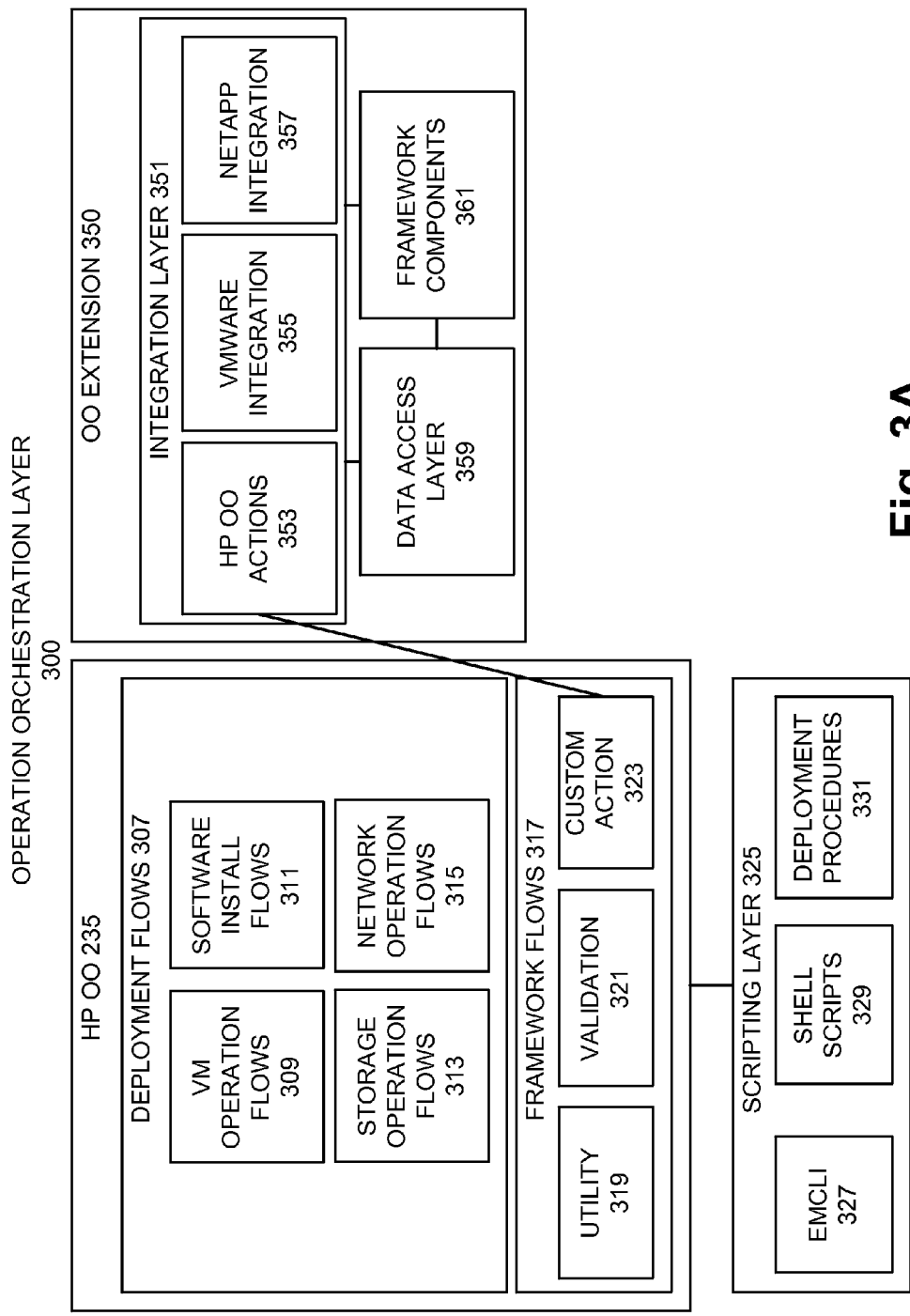
FIG. 3A is a diagram illustrating another representation of the operations orchestrator depicted in FIG. 2C.

FIG. 3A is a diagram illustrating another representation of operations orchestrator 234. As illustrated, an operation orchestration layer 300 of provisioning engine 220 includes HP® Operations Orchestration software 235. According to an exemplary implementation, operation orchestration layer 300 includes deployment flows 307 and framework flows 317.

Deployment flows 307 include flows pertaining to the provisioning of a resource, such as an application, storage, etc. According to an exemplary implementation, deployment flows 307 include VM operation flows 309, software install flows 311, storage operation flows 313, and network operation flows 315. VM operation flows 309 include flows pertaining to the provisioning of virtual machines. Software install flows 311 include flows pertaining to the installation of software. Storage operation flows 313 include flows pertaining to the provisioning of storage. Network operation flows 315 include flows pertaining to the provisioning of network resources.

Framework flows 317 includes flows pertaining to common and re-occurring tasks, such as logging (e.g., to a database), etc., and other tasks to used to perform a flow. According to an exemplary implementation, framework flows 317 include utility flows 319, validation flows 321, and custom action flows 323. Utility flows 319 include flows pertaining to common tasks, such as logging into a physical resource of data centers 250, database 215, etc. Validation flows 321 include flows pertaining to validation, such as a user's name, password, parameter validation, network address validation, etc. Custom action flows 323 include flows that are not entirely supported by HP® Operations Orchestration software 235. For example, as previously described, HP® Operations Orchestration software 235 may be unable to integrate with a system of standard operating environment 100 or the available integration may not suitable for the given requirements.

Java code 237 or other suitable programming language code may be used to build integration to the system. As illustrated in FIG. 3A, OO Extension 350 may serve as an extension to HP OO 235. For example, OO Extension 350 may be implemented using Java code 237. OO Extension 350 includes an integration layer 351. Integration layer 351 includes HP OO Actions 353, VMware Integration 355, NetApp Integration 357, Data Access Layer 359, and Framework Components 361.

HP OO Actions 353 includes logic to execute and/or integrate the custom flows of custom action 323. VMware Integration 355 includes a VMware Application Programming Interface (API) to integrate with hypervisor 270 (e.g., a VMware® hypervisor). NetApp Integration 357 includes a NetApp API (e.g., a workflow automator (WFA)) to integrate with storage 255 (e.g., NetApp® FAS6280 enterprise storage system).

Data Access Layer 359 includes a relational data structure of database 215. For example, the relational data structure includes connectivity specification data that allows for communication between the components of integration layer 351. For example, the connectivity specification data may include data indicating network ports, service ports, etc.

Framework Components 361 include the necessary tools to communicate to the framework elements (Net app storage, network components), tools provided by the vendors (e.g., APIs) to communicate with the component.

Scripting Layer 325 includes Enterprise Manager Command Line Interface (EMCLI) scripts 327, Shell scripts 329, and deployment procedure scripts 331.

EMCLI scripts 327 includes scripts that communicate with Oracle® Enterprise Grid Control to perform specific tasks on various entities (e.g., a host, a database, software, etc.) via a text-based console (e.g., shells, command windows, etc.). For example, framework flows 317 may call EMCLI scripts 327 to communicate commands via a hypervisor (e.g., an OVM hypervisor) to create a guest instance.

Shell scripts 329 include customized operating system scripts to complete specific tasks during deployment, creation, destruction, installation, etc., of various entities, such as VMs, databases, and software. For example, framework flows 317 may call shell scripts 329 to communicate commands to an operating system (e.g., a VM) to complete additional configurations. According to an exemplary implementation, shell scripts 329 are written in Linux scripting languages (e.g., Perl, Python, Bash, etc.).

Deployment procedure scripts 331 include scripts provided by Oracle® Enterprise Manager that include logic to deploy databases, operation systems, and software. For example, framework flows 317 call deployment scripts 331 to communicate commands to an OVM hypervisor. As an example, the commands may provide details pertaining to the VM (e.g., name of VM, size of the VM, etc.).

Figure 3B:
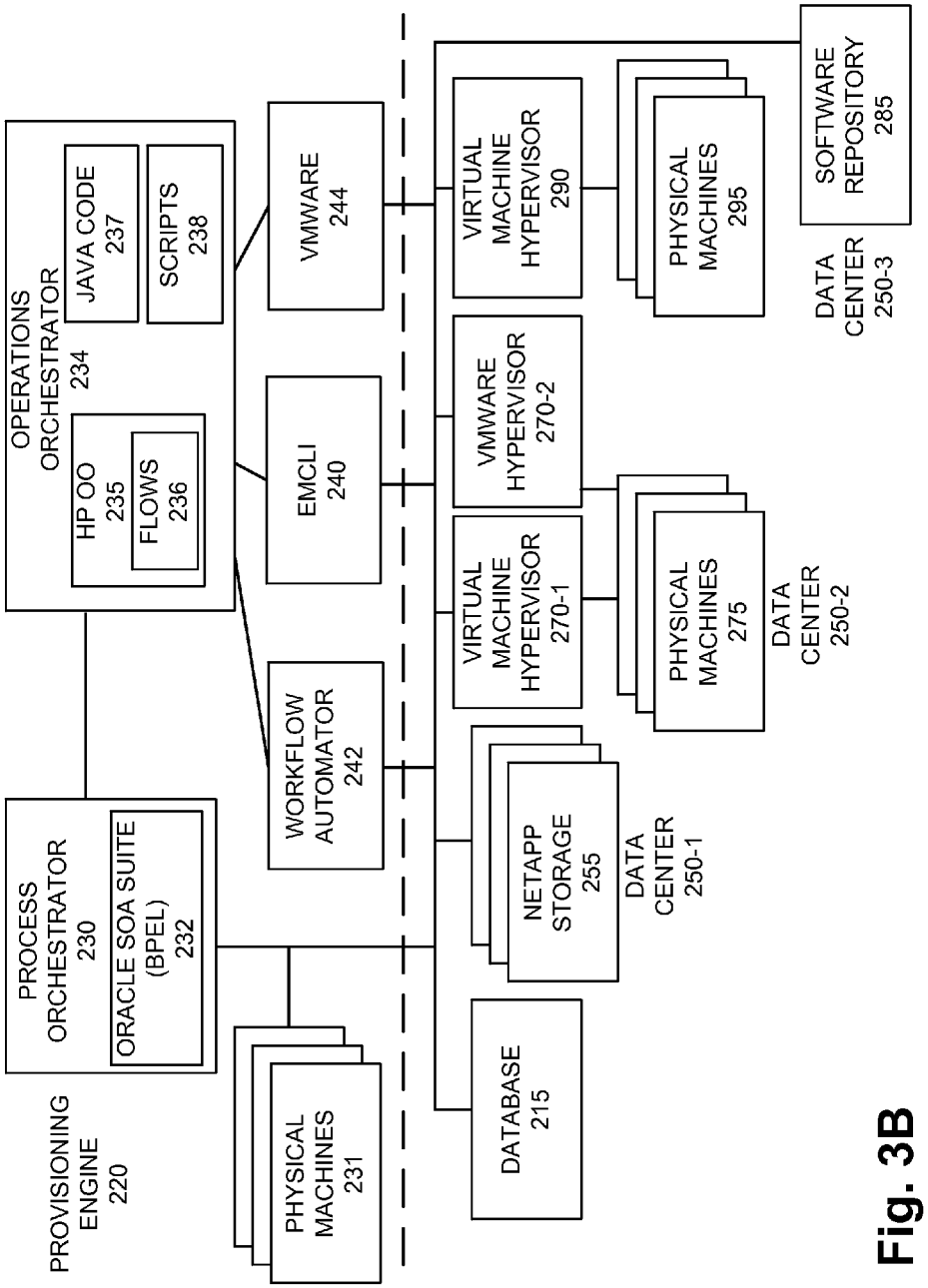
FIG. 3B is a diagram illustrating an exemplary implementation of the standard operating environment.

FIG. 3B is a diagram illustrating an exemplary implementation of a standard operating environment. As illustrated, provisioning engine 220 includes process orchestrator 230 and operations orchestrator 234 that are implemented on physical machines 231. Physical machines 231 may be implemented as a server element 110 that matches the devices of physical machines 275 and 285. Provisioning engine 220 also includes a workflow automator 242, an EMCLI 240, and a VMware 244, which are described further below.

Provisioning engine 220 is communicatively coupled to data centers 250 and database 215, as previously illustrated in FIG. 2A. According to an exemplary implementation, referring to data center 250-1, storage 255 is implemented with a NetApp® FAS6280 enterprise storage system. According to such an implementation, Netapp provides workflow automation software (i.e., Netapp® Workflow Automator). The workflow automation software is illustrated in FIG. 3B as workflow automator 242. Workflow automator 242 enables the design and automated execution of administrative tasks, such as storage capacity provisioning, system setup, data migration, and storage reclamation.

Referring to data center 250-2, according to an exemplary implementation, hypervisors 270-1 and 270-2 may be implemented with Oracle® VM Server virtualization software and VMware® virtualization software to accommodate different software on physical machines 275. According to such an implementation, EMCLI 240 of provisioning engine 220 provides an interface to Virtual Machine hypervisor 270-1 and VMware 244 of provisioning engine 220 includes an API to VMware hypervisor 270-2. Referring to data center 250-3, EMCLI 240 also provides an interface to Virtual Machine hypervisor 290. Operations orchestrator 234 may interface with software repository 285.

Figure 4:
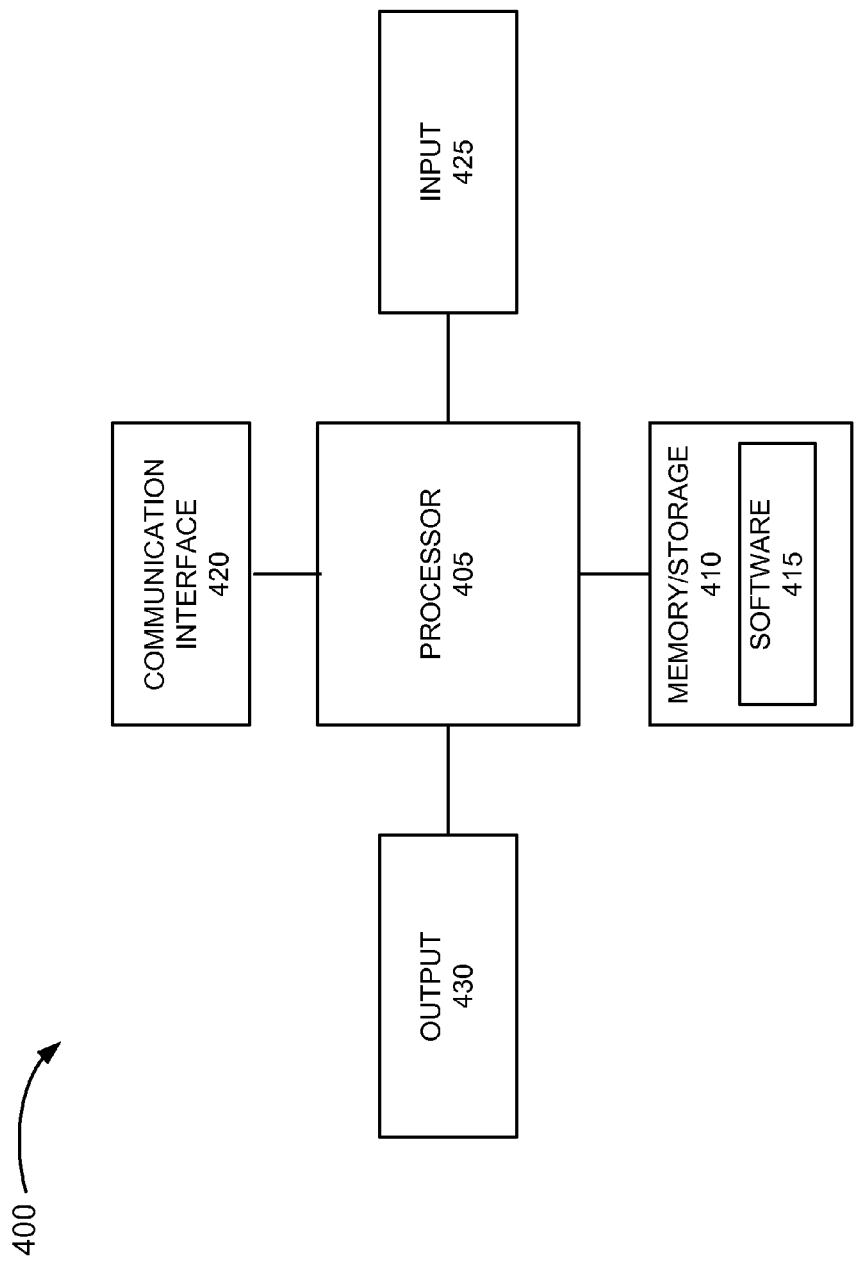
FIG. 4 is a diagram illustrating exemplary components of a device that may correspond to one or more device depicted.

FIG. 4 is a diagram illustrating exemplary components of a device 400 that may correspond to one or more of the devices depicted in the previous figures. As illustrated, according to an exemplary embodiment, device 400 includes a processor 405, memory/storage 410, software 415, a communication interface 420, an input 425, and an output 430. According to other embodiments, device 400 may include fewer components, additional components, different components, and/or a different arrangement of components than those illustrated in FIG. 4 and described herein.

Processor 405 may include one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (e.g., one or multiple cores), microcontrollers, and/or some other type of component that interprets and/or executes instructions and/or data. Processor 405 may be implemented as hardware (e.g., a microprocessor, etc.) or a combination of hardware and software (e.g., a SoC, an ASIC, etc.). Processor 405 may include one or multiple memories (e.g., memory/storage 410), etc.

Processor 405 may control the overall operation or a portion of operation(s) performed by device 400. Processor 405 may perform one or multiple operations based on an operating system and/or various applications or programs (e.g., software 415). Processor 405 may access instructions from memory/storage 410, from other components of device 400, and/or from a source external to device 400 (e.g., a network, another device, etc.).

Memory/storage 410 may include one or multiple memories and/or one or multiple other types of storage mediums. For example, memory/storage 410 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a phase-change memory (PCM), a dual in-line memory module (DIMM), a flash memory, and/or some other type of memory. Memory/storage 410 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 410 may include drives for reading from and writing to the storage medium.

Memory/storage 410 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray® disk (BD), etc.). Memory/storage 410 may store data, software, and/or instructions related to the operation of device 400.

Software 415 may include an application or a program that provides a function and/or a process. Software 415 may include firmware. Communication interface 420 may permit device 400 to communicate with other devices, networks, systems, etc. Communication interface 420 may include one or multiple wireless interfaces and/or wired interfaces. Communication interface 420 may include one or multiple transmitters, receivers, and/or transceivers. Communication interface 420 may operate according to one or multiple protocols, standards, and/or the like.

Input 425 may permit an input into device 400. For example, input 425 may include a keyboard, a mouse, a display, a touchscreen, a touchless screen, a button, a switch, an input port, speech recognition logic, and/or some other type of visual, auditory, tactile, etc., input component. Output 430 may permit an output from device 400. For example, output 430 may include a speaker, a display, a touchscreen, a touchless screen, a light, an output port, and/or some other type of visual, auditory, tactile, etc., output component.

Device 400 may perform processes and/or functions, as described herein, in response to processor 405 executing software 415 stored by memory/storage 410. By way of example, instructions may be read into memory/storage 410 from another memory/storage 410 or read into memory/storage 410 from another device via communication interface 420. The instructions stored by memory/storage 410 may cause processor 405 to perform one or more processes described herein. Alternatively, for example, according to other implementations, device 400 may perform one or more processes described herein based on the execution of hardware (processor 405, etc.) or the execution of software (e.g., processor 405 executing software 415).

Referring back to FIG. 2A, user interface 205 allows a user to make a provisioning request and automate the provisioning thereof. The provisioning request may be stored in database 215. Provided below is a description of an exemplary process for executing a provisioning request. A description of Operations Orchestrator (OO) scripts or flows is provided in the Appendix to this specification.

Figure 5A:
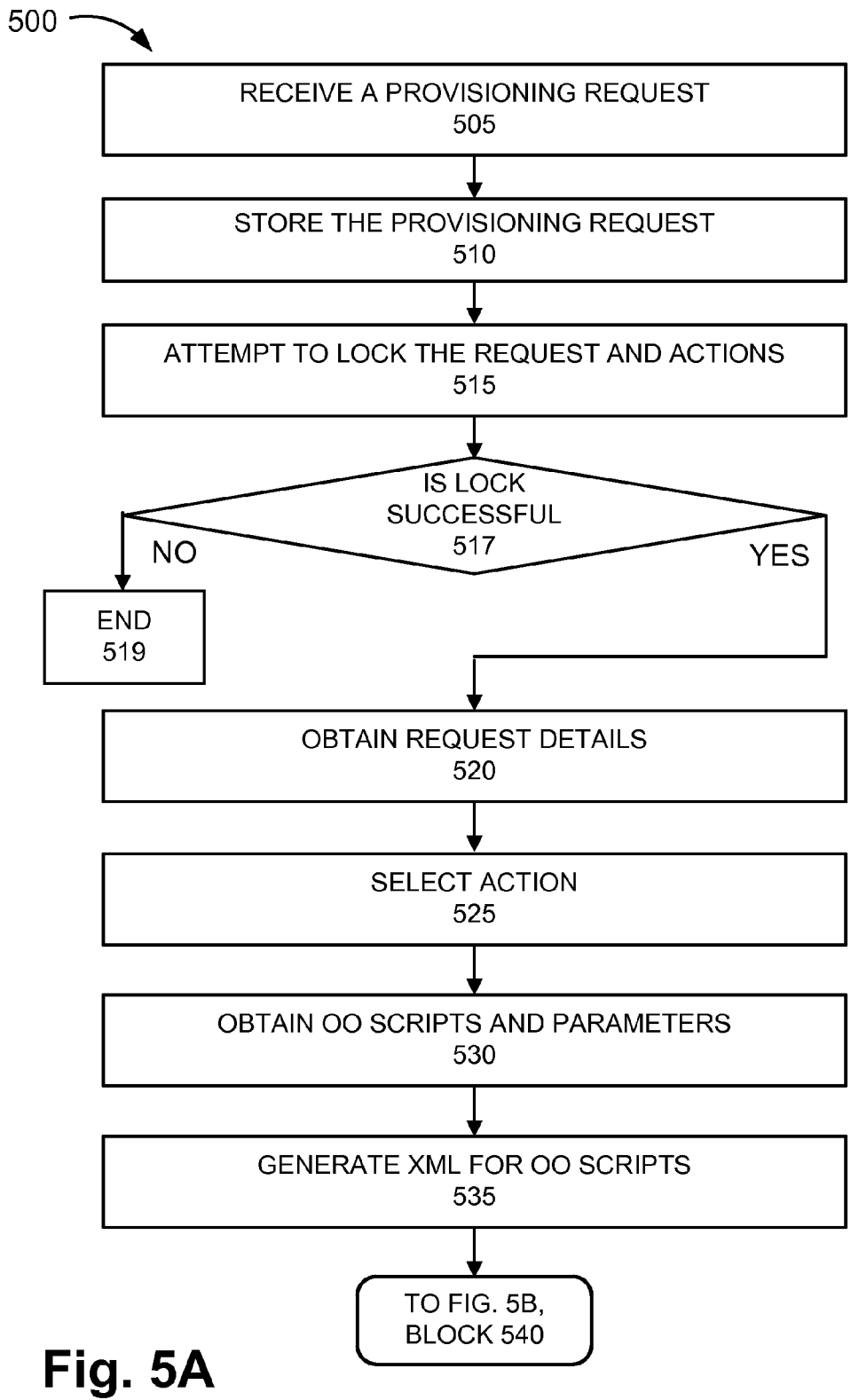
FIGS. 5A-5C is a flow diagram illustrating an exemplary process of a workflow for provisioning in the standard operating environment.
Figure 5B:
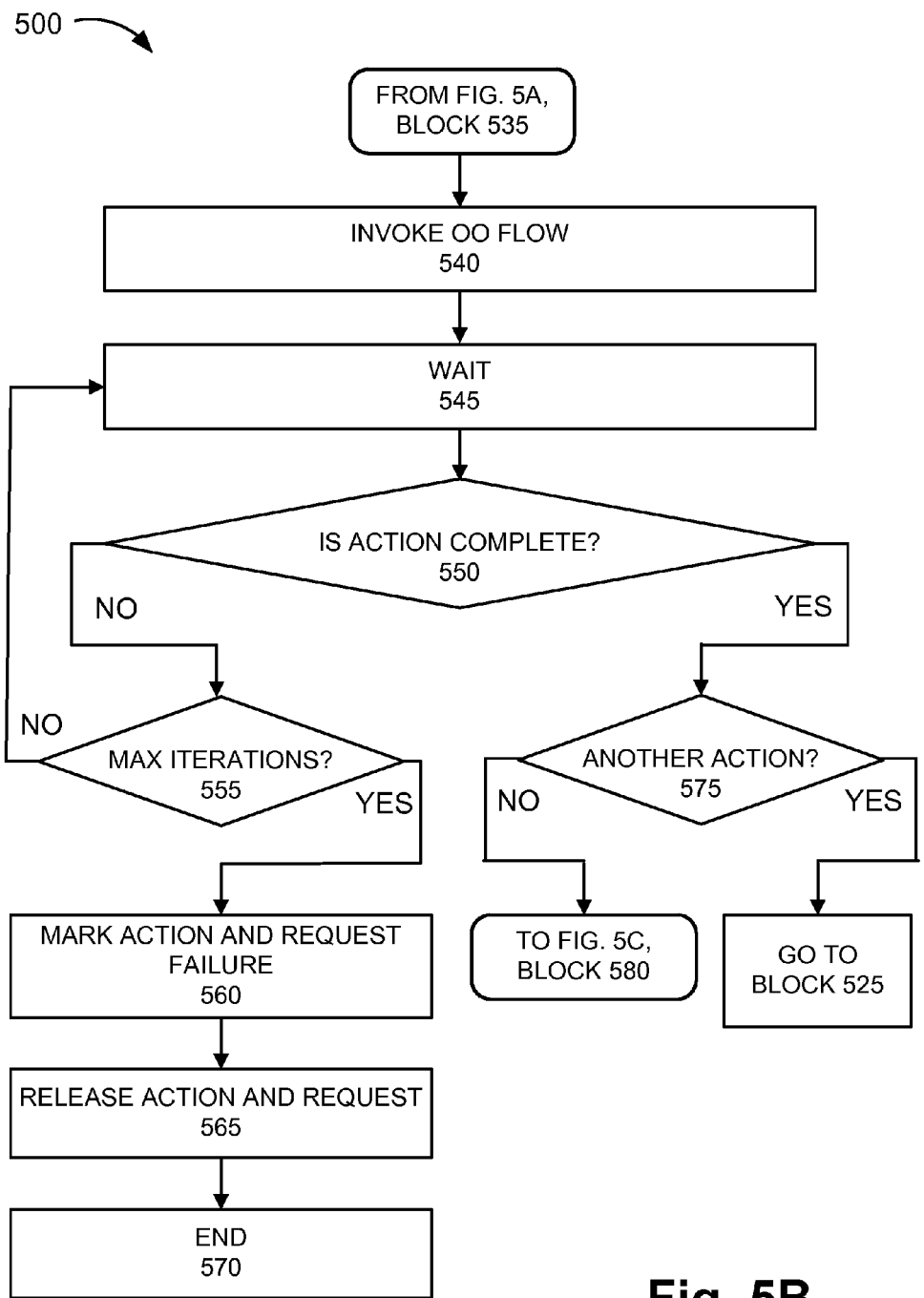
Figure 5C:
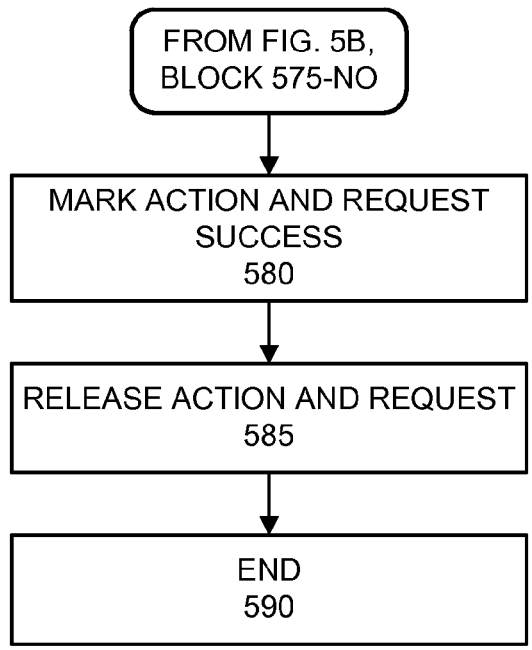

FIGS. 5A-5C are flow diagrams of an exemplary process of a workflow for provisioning in the standard operating environment.

Referring to FIG. 5A, block 505, process 500 begins with receiving a provisioning request. For example, an administrator of the standard operating environment creates a provisioning request via the workflow tool of hardware and software management tool 125. The workflow tool may be implemented in user interface 205. For example, user interface 205 may be implemented as a web service for the administrator. The provisioning request may, for example, serve as a request to provision a virtual machine in one of the data centers 250-2 or 250-3. Access logic 210 manages the authorization and privileges associated with the administrator relating to the creation of the provisioning request.

In block 510, the provisioning request is stored. For example, the workflow tool stores the provisioning request in database 215.

In block 515, an attempt to lock the provisioning request and actions is initiated. According to an exemplary embodiment, provisioning engine 220 locks the processing of the provisioning request to avoid conflicts with other users/provisioning requests. For example, the administrator may invoke the execution of the provisioning request via user interface 205. In order for the provisioning engine 220 to lock the provisioning request for execution, the administrator may ensure that the resources are available. For example, the administrator, via user interface 205, may analyze the capacity or check the availability of the resource to be provisioned. For example, assume the provision request pertains to provisioning a virtual machine. In this case, the administrator may analyze or check the availability of computing resources (e.g., CPU) to execute the provisioning of the virtual machine, storage (e.g., memory) to store provisioning details pertaining to the virtual machine, capacity in the network (e.g., bandwidth) that allows the provisioned virtual machine to perform within the standard operating environment, and a virtual network interface card that allows communication between the provisioned virtual machine and other components in the standard operating environment.

In block 517, it is determined whether the lock is successful. For example, if user interface 205 indicates a confirmation that the resources are available (block 517—YES), then provisioning engine 220 (e.g., operations orchestrator 234) is locked for processing the provisioning request and process 500 continues to block 520. If it is determined that the lock unsuccessful (block 517—NO), then process 500 ends (block 519). For example, is user interface 205 indicates that the resources are not available, a time-out period may occur or provisioning engine 220 may proceed to satisfy another provisioning request.

In block 520, the request details are retrieved. For example, in response to obtaining an indication that the request and actions are locked, provisioning engine 220 retrieves the provisioning request information of the provisioning request from database 215. For example, the provisioning engine 220 may use an identifier associated with the provisioning request to retrieve the particular provisioning request information.

In block 525, an action is selected. For example, provisioning engine 220 (e.g., operations orchestrator 234) selects an action for satisfying the provisioning request to be performed. For example, in the case of a provisioning request to provision a VM, provisioning engine 220 determines which virtualization solution (e.g., VMWare or OVM) is to be used to satisfy the provisioning request. Additionally, for example, provisioning engine 220 determines which data center (e.g., one of data centers 250-2 or 250-3) that the VM is to be provisioned. A provisioning request may require multiple actions to be performed before the provisioning request is satisfied.

In block 530, OO scripts and parameters are obtained. For example, provisioning engine 220 (e.g., operations orchestrator 234) selects the appropriate flow(s) (e.g., deployment flows 307, framework flows 317, etc.) and parameters pertaining to the action to be performed. According to this example in which a VM is provisioned, provisioning engine 220 selects one of VM operation flows 309 from deployment flows 307 based on the provisioning request information. For example, the provisioning request information may include the amount of resources needed (e.g., in terms of memory, CPU, disk space, etc.), which data center the VM is to be provisioned (e.g., data center 250-1, data center 250-2, etc.), which type of virtual machine, etc.

In block 535, an XML for OO scripts is prepared. For example, in the case of a provisioning request to provision a VM of the OVM type, a script included in the selected VM operations flow 309 converts the parameters to a format (e.g., Extensible Markup Language (XML)) to allow those parameters to be ingested or understood by the selected VM operation flow 309. That is, for example, an XML file is generated based on input values obtained during the creation of the provisioning request. The XML file may be a format that is understood by the OO scripts. According to another example, in the case of a provisioning request to provision a VM of the VMWare type, provisioning engine 220 determines that the VM needs to be deployed on a VMWare Hypervisor. In response thereto, provisioning engine 220 selects the appropriate custom action 323 (e.g., a custom script that is not supplied or not supplied natively by HP® Operations Orchestration software 235). In addition, provisioning engine 220 selects VMWare integration 355 (e.g., a VMware API that integrates with hypervisor 270) for VM provisioning.

Referring to FIG. 5B, block 540, an OO flow is invoked. For example, provisioning engine 220 (e.g., operations orchestrator 234) executes the OO flow. Depending on the data center 250 to which the OO flow pertains, provisioning engine 220 provisions, on a physical machine (e.g., physical machine 275, physical machine 295, etc.) via a hypervisor (e.g., hypervisor 270, hypervisor 290, etc.), a virtual machine. By way of example, the Appendix includes exemplary OO flows that may be executed by provisioning engine 220.

For purposes of description, assume a flow used to deploy a Linux® operating system on a physical host or a virtual host is invoked. It may be assumed that all of the necessary parameters used in the flow have been obtained and that a physical machine or a virtual machine is ready for deployment.

In block 545, provisioning engine 220 waits a period of time for the OO flow to execute. In block 550, it is determined whether the action is complete. For example, during the execution of the OO flow, provisioning engine 220 may receive messages indicating the status of an operation (e.g., success or failure) of the flow and/or the point of the flow in which execution of the flow is occurring. Provisioning engine 220 may monitor the execution of the OO flow based on receiving messages from integration layer 351.

A description of the execution of the flow to deploy the Linux® operating system on a physical or virtual machine is provided. For an exemplary first step, a Network File System (NFS) Share is mounted on the virtual machine that contains the operating system packages needed to install the operating system. A script obtains an IP address of a media server and a path to the operating system packages. The IP address of the media server is auto-obtained based on a network range to which the physical machine or the virtual machines belongs. For an exemplary second step, a kickstart file is generated.

The kickstart file includes values needed to build the unique host. For example, these values include the IP address of the host, the subnet mask of the host, the default gateway of the host, the IP address NFS server that stores the operating system packages, and the path to the packages. The script collects all of the necessary information by interrogating the running physical or virtual machine. The script may also use hard-coded values. Once all of the values are collected, the script generates the kickstart file.

For an exemplary third step, the script determines how to partition the disks in the host most efficiently, and then generates the kickstart file parameters necessary to do so. Since not all of the physical or virtual hosts have the same disk size or number of disks, the script determines if the root partition and the swap partition should be on the same disk or different disks if the system has multiple disks based on an interrogation of the running host. The script also determines the necessary size of each partition by calculating the amount of memory in the host and basing the swap partition size on memory size. The remaining disk space may be given to the root partition. For an exemplary fourth step, the script deploys an agent on the host. For an exemplary fifth step, the script determines if the system model is "XEN" (i.e., an OVM type). If the system model is XEN, then the script deploys a file needed to properly partition the disk to the file system. For example, the file includes instructions of a kickstart file process so as to properly partition and format the disks on a XEN host before attempting to store a file system on the disks.

For an exemplary sixth step, the script creates a bootable partition with all of the necessary kickstart files on the disk needed to boot the host and begin a kickstart process. For an exemplary seventh step, the script reboots the host into the newly created bootable partition. In some instances, in the seventh step, the bootable disk is improperly identified. In such cases, for an exemplary eighth step, the script interrogates the physical or virtual machine and properly identifies which disk should be bootable and sets that disk to boot from in a grub menu.

For an exemplary ninth step, the script reboots the host into the bootable partition and waits a predetermined period of time for the host to be available again. It may be assumed that the host reboots within the predetermined period of time. For an exemplary tenth step, the script remounts a previous media server share location on the newly booted host in order to use the operation system packages for install. The script may tail the installation logs and display the logs on a screen (e.g., a user interface) in order pass information back to a user about what is occurring on the host. For an exemplary eleventh step, the script stages the installation of an agent on the host that will be used later for system management.

For an exemplary twelfth step, the script begins the configuration of the newly installed operating system. The script configures a secure shell (ssh) daemon to conform to business rules (e.g., a user may not be inactive for more than a predetermined period of time, etc.). For an exemplary thirteenth step, the script sets the hostname of the host. According to an exemplary implementation, if the hostname is not pre-defined, the script interrogates the host for a correct value. Additionally, the script configures a crontab entry on the host to clear the mail of the root user every quarter. In this way, the mail account of the root user may not fill up the file system.

For an exemplary fourteenth step, the script configures the proper time servers of the host. For example, the script determines the location of the host and then dynamically configures the network time protocol (NTP) servers on the host. In some instances, not all of the NTP servers are accessible to all hosts. Thus, using the proper time server is the only way to guarantee correct time on the host.

For an exemplary fifteenth step, the script configures a logrotate daemon to comply with business log retention policies. For example, the script may modify the configuration to retain twelve weeks of server logs on the system. The script stages the files necessary to install an agent (e.g., a tivoli agent, etc.) on the host during the next reboot. For an exemplary sixteenth step, the script stages the files necessary to install an agent (e.g., a CA e-trust agent) on the host during the next reboot. The script also stages the files necessary to install an agent (e.g., a BMC patrol agent) on the host during the next reboot.

For an exemplary seventeenth step, the script determines if the host is a VMware VM by interrogating the running machine, and if so, pre-stages the files necessary to deploy the VMware Tools on the host. If the host is not a VMware VM, the script will perform an auto-skip.

For an exemplary eighteenth step, the script configures the host to auto-start or auto-stop various system services (e.g., network time protocol daemon (ntpd) on, xinetd on, iptables off, multipathd on, kudzu off, cups off, smartd off, avahi-daemon off, avahi-dnsconfd off) required for normal operation. The script also deploys a number of configuration files on the host needed for its proper operation. The files may be pulled from the media share mounted earlier. The files may be deployed to their necessary locations on the host.

For an exemplary nineteenth step, the script determines if the host is a physical host and if so, configures the system to use network bonding. The script cycles through each network interface on the host, configures them with the proper network settings, and then pings a default gateway. If the gateway can be pinged, then that network interface is determined to be a part of the network bond. Once all of the network interfaces have been cycled through, the network interfaces that were determined to be a part of the bond are configured in a bonded network setup. If the host is a virtual machine, the script will perform an auto-skip. Additionally, when the host is a physical host, an Emulex fiber-channel adapter drivers and application are installed on the host. Similarly, if the host is a virtual machine, the script will perform an auto-skip.

For an exemplary twentieth step, the script deploys a script that will have the system auto-mount a media repository during the next boot. For example, this may be performed to complete the installation of the agents (e.g., eTrust, Tivoli, etc.) and/or other applications. Once the script mounts the media share, the script performs an auto-remove of itself from the host.

For an exemplary twenty-first step, the script reboots the host to complete the installation. For an exemplary twenty-second step, the script writes a completion file to the host file system in a particular path (e.g., /tmp/builddone) that will allow other scripts to identify when the server is done building itself. The script also updates a file (e.g., /etc/motd file) and sets the date the server was built. The script waits (e.g., a configurable amount of time) for the system to return from the reboot and become available.

For an exemplary twenty-third step, the script checks for the existence of the completion file. If the completion file is found, the build process continues. If the completion file is not found with a predetermined time, the build will fail. For purposes of description, it may be assumed that the completion file is found.

For an exemplary twenty-fourth step, the script determines the operating system version and the location of the host. For example, the script interrogates the host. Once the values are determined, the script auto-configures a configuration file (e.g., /etc/yum.repos.d/ULN-Base-yum.repo) for the proper operation system version and will use the yum repository that is geographically closest to the host. The script also performs a system update on the host and applies operation system patches from the yum repository previously configured.

For an exemplary twenty-fifth step, the script determines if the host is a XEN host, and if so, blacklists various kernel modules on the host. In this way, for example, the host may not load certain kernel modules but only proper modules. That is, this may be necessary for obtaining optimal performance of XEN virtual machines. If the host is determined not to be a XEN host, the script performs an auto-skip. Additionally, if the host is a XEN host, the script reconfigures the initrd to not probe the ide0 and ide1 channels and also preloads various XEN modules into the initrd for proper booting of the XEN virtual machine.

For an exemplary twenty-sixth step, the script determines if the virtual machine is a XEN guest, and if so, the script configures a file (e.g., /etc/sysctl.conf) to allow the virtual machine to independently set its system time and not use a hypervisor time. If the system is not a XEN virtual machine, the script performs an auto-skip. Additionally, the script determines if the host is a XEN virtual machine, and if so, the script configures various storage settings on the virtual machine. If the host is not a XEN virtual machine, the script performs an auto-skip.

For an exemplary twenty-seventh step, the script sets a "build date" variable on the host. The "build date" variable may be used to help determine what date the host was initially provisioned.

For an exemplary twenty-eighth step, the script determines if the host is a XEN virtual machine, and if so, the script configures the auto.home settings on the host, which may be necessary for proper use. The script determines the geographical location of the host and configures the proper share home directory based on the geographic location of the host. If the host is not a XEN virtual machine, the script performs an auto-skip.

For an exemplary twenty-ninth step, the script determines if the host is properly identified by its operating system type. If it is determined that the host has an operating system type of "unknown," then the script properly sets the operating system name.

For an exemplary thirtieth step, the script deploys agents (e.g., DDMI, DDMA, etc.) on the host. Additionally, the script determines in which data center (e.g., data center 250-1, 250-2, 250-3) the host is located. The script also checks the configuration file (e.g., /etc/ntpd.conf file) to determine if the proper network time protocol servers are configured on the host. The configuration may be changed, if necessary.

For an exemplary thirty-first step, the script deploys an agent (e.g., an ILMT agent) on the host. The script also deploys Phython Opsware API files on the host and software policies pertaining to the host.

For an exemplary thirty-second step, the script determines if the host is a VMware virtual machine, and if so, the script auto-runs a command (e.g., the /usr/bin/vmware-config-tools.pl -d command). For example, it may be necessary to auto-run the command because the kernel may have been updated and the system may not be running a new kernel. In response thereto, the system will update the VMware tools for the currently running kernel. If the host is determined not to be a VMware virtual machine, the script performs an auto-skip.

For an exemplary thirty-third step, the script determines if the network interfaces have randomly changed their names. For example, if a name changed from "eth0" to "eth1" or "eth1" to "eth0." If this occurred, then the script reconfigures the names back to their original names. The script also sets a configuration setting that will allow other systems to determine which group (e.g., business group) owns the host and, in turn, which system administrator(s) has/have access to this host.

For an exemplary thirty-fourth step, the script reboots the host after all configuration changes and updates have been made. Additionally, the script removes the Dynamic Host Configuration Protocol (DHCP) configuration for the host from the DHCP servers. In this way, the host may have a statically assigned IP address.

If it is determined that the action is not complete (block 550—NO), then it is determined whether a maximum iteration is reached (block 555). For example, based on messages received, provisioning engine 220 may store a counter to keep track of the iterations for execution. Provisioning engine 220 determines whether a maximum number of iterations have been attempted. By way of further example, provisioning engine 220 determines whether the maximum number of iterations has been attempted to provision the host.

If it is determined that the maximum iteration is not reached (block 555—NO), then process 500 continues to block 545. If it is determined that the maximum iteration is reached (block 555-YES), then the action and request is marked as a failure (block 560). For example, provisioning engine 220 stores information (e.g., in database 215) that the action and the provisioning request has failed. In block 565, the action and the request are released. For example, provisioning engine 220 releases the resource and unlocks the provisioning request. In block 570, process 500 ends.

Referring back to block 550, if it is determined that the action is complete (block 550-YES), then it is determined whether there is another action (block 575). For example, provisioning engine 220 determines whether another flow to satisfy the provisioning request needs to be performed. If it is determined that there is another action (block 575-YES), then process 500 continues to block 525.

If it is determined that there is not another action (block 575—NO), then the action and the request is marked as a success (FIG. 5C, block 580). For example, provisioning request 220 stores information (e.g., in database 215) that the action and the provisioning request has succeeded. In block 585, the action and the request are released. For example, provisioning engine 220 releases the resource and unlocks the provisioning request. In block 590, process 500 ends.

Although FIGS. 5A-5C illustrate an exemplary process 500 pertaining to a workflow for provisioning in the standard operating environment, according to other embodiments, process 500 may include additional operations, fewer operations, and/or different operations than those illustrated in FIGS. 5A-5C and described herein. For example, the actions described in relation to the script for building the host are exemplary and other types of automated provisioning will include a different set of actions.

The number of devices, the number of networks, and the configuration in environment 100 are exemplary and provided for simplicity. According to other embodiments, environment 100 may include additional devices, fewer devices, different devices, and/or differently arranged devices, than those illustrated in FIG. 1. Additionally, or alternatively, environment 100 may include an additional network and/or a differently arranged network than the network illustrated in FIG. 1.

The foregoing description of embodiments provides illustration, but is not intended to be exhaustive or to limit the embodiments to the precise form disclosed. Accordingly, modifications to the embodiments described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The term "exemplary" is intended to be interpreted to mean "serving as an example."

In addition, while a series of blocks has been described with regard to the process illustrated in FIGS. 5A-5C, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software, firmware, and/or hardware. For example, a process or a function may be implemented as "logic" or as a "component." This logic or this component may include hardware (e.g., processor 405, etc.) or a combination of hardware and software (e.g., software 415). The embodiments have been described without reference to the specific software code since software can be designed to implement the embodiments based on the description herein.

Additionally, embodiments described herein may be implemented as a non-transitory storage medium that stores data and/or information, such as instructions, program code, data structures, program modules, an application, etc. A non-transitory storage medium includes one or more of the storage mediums described in relation to memory/storage 410.

In the preceding specification, various embodiments have been described with reference to the accompanying drawings. Various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

No element, act, or instruction described in the present application should be construed as critical or essential to the embodiments described herein unless explicitly described as such.

What is claimed is:

1. A system comprising:
a provisioning engine device comprising:
a process orchestrator; and
an operations orchestrator, wherein the provisioning engine device comprises:
a communication interface;
a storage medium, wherein the storage medium stores provisioning flows, wherein the provisioning flows provision storage, virtual machines, software, and network resources;
a memory, wherein the memory stores instructions; and
a processor, wherein the processor executes the instructions to:
receive, by the process orchestrator, a provisioning request to provision a resource of a data center;
read provisioning request information included in the provisioning request; and
control an execution of the provisioning request via the operations orchestrator, wherein the execution includes the processor to execute the instructions to:
identify a type of the resource to be provisioned, wherein the type of the resource includes a virtual machine;
select an action to perform based on the provisioning request information and the type of the resource;
obtain one of the provisioning flows, from the storage medium, to carry out the action;
execute the one of the provisioning flows, wherein when the resource is a virtual machine of a first type, an execution of the one of the provisioning flows includes to:
select a custom script that, when executed, integrates with a hypervisor of the resource that does not integrate with the operations orchestrator; and
execute the custom script;
monitor an execution of the one of the provisioning flows;
determine whether the execution is successful;
determine whether another action is to be performed to satisfy the provisioning request in response to a determination that the execution of the one of the provisioning flows is successful; and
select another action to perform in response to a determination that another action is to be performed.

2. The system of claim 1, wherein the system further comprising:
a plurality of data centers, wherein each data center comprises:
a hypervisor device; and
server devices, wherein each server device comprises identical hardware including a same processor, a same memory, a same hard drive, and a same blade, and each server device is connected to multiple links, wherein each link has a same bits-per-second capacity, wherein the hypervisor device is communicatively coupled to each server device.

3. The system of claim 2, wherein during the execution of the one of the provisioning flows, the processor executes the instructions to:
communicate, via the communication interface, commands to the hypervisor device of one of the plurality of data centers, wherein the commands provision the resource, and wherein the one of the plurality of data centers is the data center.

4. The system of claim 2, wherein during the execution of the one of the provisioning flows, the processor executes the instructions to:
   determine whether the resource of the data center is available to provision; and
   lock the resource of the data center from other provisioning requests in response to a determination that the resource of the data center is available.

5. The system of claim 1, wherein the provisioning request includes a creation of a virtual machine guest instance, wherein the execution of the one of the provisioning flows includes to:
   invoke a command line interface script to communicate commands via a hypervisor.

6. The system of claim 1, wherein the storage medium stores utility flows, wherein the execution of the one of the provisioning flows includes to:
   identify the action as a common action; and
   invoke one of the utility flows to execute the common action.

7. The system of claim 1, wherein the processor executes the instruction to:
   receive another provisioning request to provision another resource of the data center;
   read provisioning request information included in the other provisioning request; and
   control an execution of the other provisioning request via the operations orchestrator, wherein the execution of the other provisioning request includes the processor to execute the instructions to:
   identify a type of the other resource to be provisioned, wherein the type of the other resource includes a virtual machine of a second type;
   select another action to perform based on the provisioning request information of the other provisioning request and the type of the other resource;
   obtain another one of the provisioning flows, from the storage medium, to carry out the other action; and
   execute the other one of the provisioning flows, wherein an execution of the other one of the provisioning flows includes to:
      execute a script, which is included in the other one of the provisioning flows pertaining to the type of the other resource, wherein the script converts parameters included in the provisioning request information of the other provisioning request to a format that can be executed by the other one of the provisioning flows, wherein the first type and the second type are different in terms of virtualization software vendor.

8. The system of claim 1, wherein the execution of the one of the provisioning flows includes to:
   store business rules; and
   use an application programming interface to delegate provisioning of the resource via the operations orchestrator based on one or more of the business rules.

9. A method comprising:
   storing provisioning flows, wherein the provisioning flows provision storage, virtual machines, software, and network resources;
   receiving, by a device, a provisioning request to provision a resource of a data center;
   reading, by the device, provisioning request information included in the provisioning request; and
   controlling, by the device, an execution of the provisioning request, wherein the controlling includes:
      identifying a type of the resource to be provisioned, wherein the type of the resource includes a virtual machine;
      selecting an action to perform based on the provisioning request information and the type of the resource;
      obtaining one of the provisioning flows to carry out the action;
      executing the one of the provisioning flows, wherein when the resource is a virtual machine of a first type, the executing includes:
         selecting a custom script that, when executed, integrates with a hypervisor of the resource that does not integrate with an operations orchestrator of the device; and
         executing the custom script;
      monitoring an execution of the one of the provisioning flows;
      determining whether the execution is successful;
      determining whether another action is to be performed to satisfy the provisioning request in response to a determination that the execution of the one of the provisioning flows is successful; and
      selecting another action to perform in response to a determination that another action is to be performed.

10. The method of claim 9, further comprising:
    receiving another provisioning request that includes provisioning request information; and
    converting parameters of the provisioning request information included in the other provisioning request to a format that can be executed by another one of the provisioning flows, when another resource to be provisioned is a virtual machine of a second type, wherein the first type and the second type are different in terms of virtualization software vendor.

11. The method of claim 9, wherein the data center comprises:
    a hypervisor device; and
    server devices, wherein each server device comprises identical hardware including a same processor, a same memory, a same hard drive, and a same blade, and each server device is connected to multiple links, wherein each link has a same bits-per-second capacity, wherein the hypervisor device is communicatively coupled to each server device, and the method further comprises:
    communicating commands to hypervisor device, wherein the commands provision the resource.

12. The method of claim 9, further comprising:
    storing business rules; and
    using an application programming interface to delegate provisioning of the resource based one or more of the business rules.

13. The method of claim 9, wherein the provisioning request includes a creation of a virtual machine guest instance, and the method further comprises:
    invoking a command line interface script to communicate commands via a hypervisor.

14. The method of claim 9, further comprising:
    determining whether the resource of the data center is available to provision; and
    locking the resource of the data center from other provisioning requests in response to a determination that the resource of the data center is available.

15. The method of claim 9, further comprising:
    receiving another provisioning request to provision another resource of another data center;
    reading other provisioning request information included in the other provisioning request; and controlling an execution of the other provisioning request, wherein the controlling includes:
identifying a type of the other resource to be provisioned, wherein the type of the other resource includes a network attached storage or software;
selecting an action to perform based on the other provisioning request information and the type of the other resource;
obtaining another one of the provisioning flows to carry out the action;
executing the other one of the provisioning flows;
monitoring an execution of the other one of the provisioning flows;
determining whether the execution of the other one of the provisioning flows is successful;
determining whether another action is to be performed to satisfy the other provisioning request in response to a determination that the execution of the other one of the provisioning flows is successful; and
selecting another action to perform in response to a determination that another action is to be performed.

16. A non-transitory storage medium storing instructions executable by a computational device, wherein the instructions comprise instructions to:
store provisioning flows, wherein the provisioning flows provision storage, virtual machines, software, and network resources;
receive a provisioning request to provision a resource of a data center;
read provisioning request information included in the provisioning request; and
control an execution of the provisioning request, wherein to control includes to:
identify a type of the resource to be provisioned, wherein the type of the resource includes a virtual machine;
select an action to perform based on the provisioning request information and the type of the resource;
obtain one of the provisioning flows to carry out the action;
execute the one of the provisioning flows, wherein when the resource is a virtual machine of a first type, an execution of the one of the provisioning flows includes to:
select a custom script that, when executed, integrates with a hypervisor of the resource that does not integrate with an operations orchestrator; and
execute the custom script;
monitor an execution of the one of the provisioning flows;
determine whether the execution is successful;
determine whether another action is to be performed to satisfy the provisioning request in response to a determination that the execution of the one of the provisioning flows is successful; and
select another action to perform in response to a determination that another action is to be performed.

17. The non-transitory storage medium of claim 16, wherein the instructions comprise further instructions to:
receive another provisioning request to provision another resource of the data center;
read provisioning request information included in the other provisioning request; and
control an execution of the other provisioning request via the operations orchestrator, wherein the instructions to control the execution of the other provisioning request includes instructions to:
identify a type of the other resource to be provisioned, wherein the type of the other resource includes a virtual machine of a second type;
select another action to perform based on the provisioning request information of the other provisioning request and the type of the other resource;
obtain another one of the provisioning flows, from the storage medium, to carry out the other action; and
execute the other one of the provisioning flows, wherein the instructions to execute the other one of the provisioning flows includes instructions to:
execute a script, which is included in the other one of the provisioning flows pertaining to the other resource, wherein the script converts parameters included in the provisioning request information of the other provisioning request to a format that can be executed by the other one of the provisioning flows.

18. The non-transitory storage medium of claim 16, wherein the instructions comprise further instructions to:
determine whether the resource of the data center is available to provision; and
lock the resource of the data center from other provisioning requests in response to a determination that the resource of the data center is available.

19. The non-transitory storage medium of claim 16, wherein the instructions comprise further instructions to:
store utility flows;
identify the action as a common action; and
invoke one of the utility flows to execute the common action.

20. The non-transitory storage medium of claim 16, wherein the instructions comprise further instructions to:
invoke a command line interface script to communicate commands via a hypervisor.

* * * * *